June 27, 1933. V. G. APPLE 1,915,877
BRAKE OPERATING MECHANISM
Filed Aug. 2, 1929
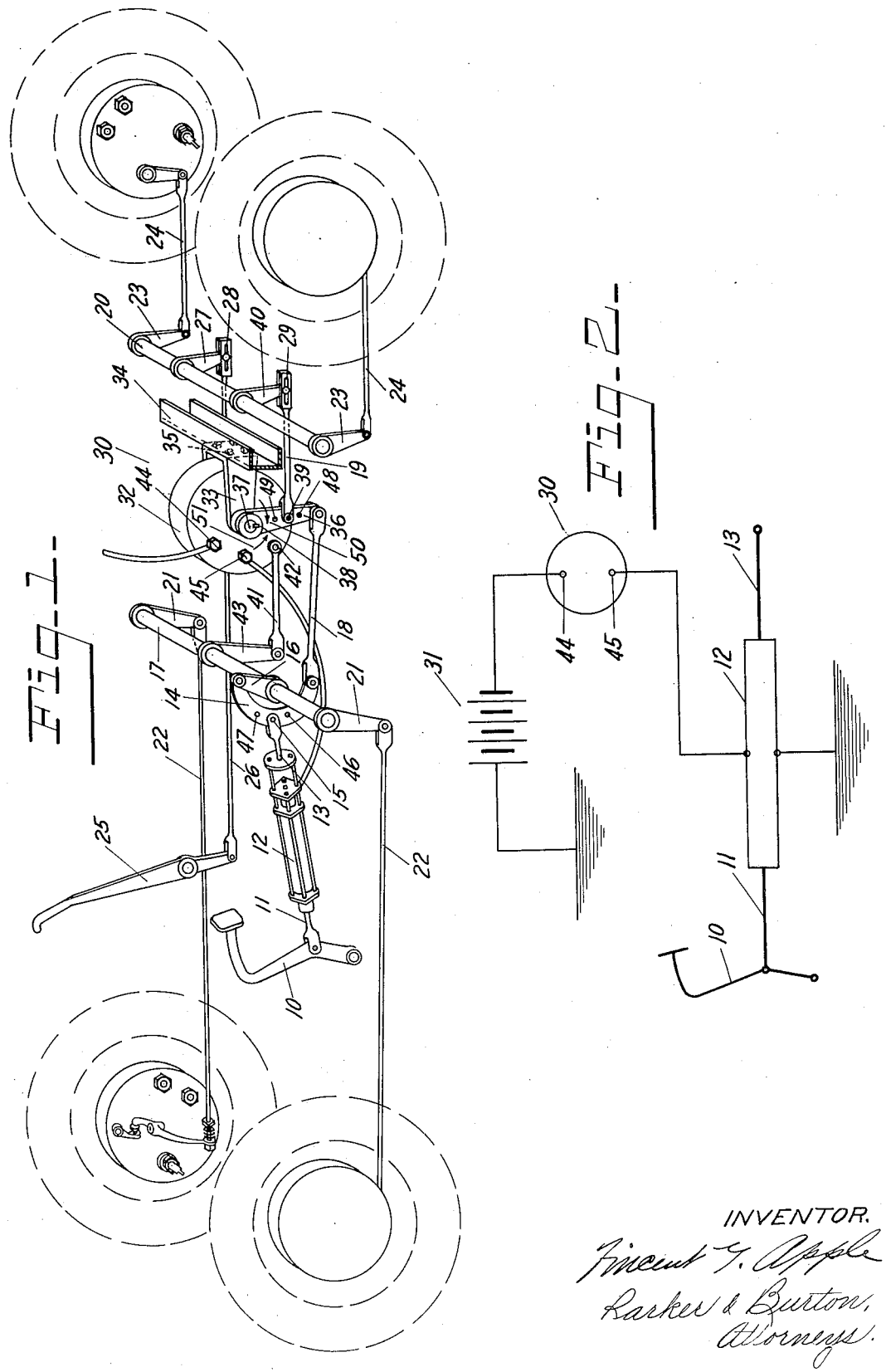
INVENTOR.
Vincent G. Apple
Parker & Burton,
Attorneys.

Patented June 27, 1933

1,915,877

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

BRAKE OPERATING MECHANISM

Application filed August 2, 1929. Serial No. 382,937.

My invention relates to improvements in automotive braking mechanism and particularly to those adapted for manual and power application, and is embodied in four wheel braking mechanism having equalizing means between the front and rear brakes. It has special reference to a braking system of the booster type wherein power means are employed to assist the manual brake applying means.

An object of the invention is to enable the operator to apply a far greater effective braking force than is ordinarily possible with the usual pressure exerted on the foot pedal. In so doing I utilize as a power means a dynamo electric machine wherein the field and armature elements are both free to rotate, each in a direction opposite the other by reaction one against the other, and connect it to the brake applying linkage so that the rotation of one element in the one direction applies the front wheel brakes and rotation of the other element in the opposite direction applies the rear wheel brakes, to the end that the effort of the power means may equalize between the front and rear brakes without interference with and without complicating the mechanism employed to manually accomplish the same purpose.

A further object is to attain this increased braking force without necessitating any increase in the pressure ordinarily applied to the foot pedal. Still another object of this invention is to secure the above advantages by means of an auxiliary force applying mechanism which operates independently of the usual system, but is controlled by the operation of said usual system.

In attaining these and other objects I provide the mechanism arranged as shown in the accompanying drawing, wherein Fig. 1 shows a conventional hook-up for mechanically operable equalizing brakes with electrically controlled mechanism embodying my invention added thereto.

Fig. 2 is a diagram of the electrical connections.

Similar numerals refer to similar parts throughout the several views.

In the drawing the brake pedal 10 is connected by rod 11 to a resistor 12. The resistor 12 is connected by a rod 13 to equalizing link 14 by a pin 15. Link 14 connects directly to arm 16 on front brake shaft 17 and through rods 18 and 19 to rear brake shaft 20. Detailed construction of the resistor 12 is shown and described in my copending application, Serial No. 285,091, filed June 13th, 1928.

Front brake shaft 17 operates the forward brakes through arms 21 and rods 22 while rear brake shaft 20 operates the rear brakes through arms 23 and rods 24. The emergency lever 25 may operate the rear brakes through rod 26 and arm 27. Overrunning mechanism is provided at 28 and 29 to permit the foot and emergency levers to be operated one independently of the other as in common practice.

The power means comprises an electric motor 30, adapted to receive its current supply from a battery 31 or similar source, the volume of current being governed by resistor 12, the strength of which varies in proportion to the manual pressure being exerted on pedal 10.

The motor 30 has its field 32 trunnioned to revolve in a frame 33 which is secured to cross member 34 by bolts, 35. The arm 36 is secured in the end of the armature shaft 37 by key 38. The rod 19 is pivotally supported on arm 36 by pin 39. Rod 19 is adapted to operate the rear brake shaft 20 through arm 40.

A rod 41 is pivotally supported on field 32 by pin 42. Rod 41 is adapted to operate the front brake shaft 17 through arm 43. Insulated binding posts 44 and 45 are provided to convey current to and from the motor.

By shifting pin 15 to holes 46 or 47 the distribution of manual effort between the front and rear brakes may be varied. Similarly by shifting pin 39 to holes 48 or 49 the distribution of power effort between front and rear brakes may be varied.

To apply the brakes the operator depresses pedal 10 drawing rod 11, resistor 12 and rod 13 forward, thereby applying the brakes manually in the usual manner. But tension in rods 11 and 13 causes a circuit to be made through resistor 12 and consequently through motor 30, and the more tension in rods 11 and 13, the more current flows through motor 30. The result of the current flowing through motor 30 is that pin 39 tries to move in the direction of the arrow 50 while pin 42 tries to move in the direction of the arrow 51 whereby power effort is applied through rods 41 and 19 to the front and rear brakes respectively.

From the foregoing description it is obvious that the power brake applying effort may always be maintained at a predetermined ratio to the manual brake applying effort and that both the manual and the power effort may be divided in predetermined ratio between the front and rear brakes.

Having shown and described an embodiment of my invention, I claim:—

1. Brake mechanism comprising, in combination, front wheel brakes, rear wheel brakes, an electric motor having both field and armature elements revolvable, and connections whereby revolution of the one element operates the front wheel brakes and revolution of the other element operates the rear wheel brakes.

2. Brake mechanism comprising, in combination, two sets of brakes, an electric motor having both field and armature elements revolvable, and connections whereby revolution of the one element operates one set of brakes and revolution of the other element operates the other set of brakes.

3. Brake mechanism comprising, in combination, front wheel brakes, rear wheel brakes, an electric motor having its field element and its armature element revolvable in opposite directions, operative connections from one element to the front wheel brakes, and operative connections from the other element to the rear wheel brakes.

4. Brake mechanism comprising, in combination, two pairs of brakes, an electric motor having a trunnion at each end of its field element, a frame having bearings to rotatably support said trunnions, an armature shaft rotatably supported in said trunnions, an arm carried by said shaft, linkage connecting a point near the outer diameter of the field element to one pair of brakes, and linkage connecting a point on the arm to the other pair of brakes.

5. Brake mechanism comprising, in combination, a plurality of brakes, an electric motor having a revolvable field and a revolvable armature, an operating connection coupling one brake with the field at a point remote from its axis and an operating connection coupling a second brake with the armature at a point remote from its axis.

6. Brake mechanism comprising, in combination, two pairs of brakes, an electric motor having both field and armature revolvable, a bearing pin radially removed from the motor axis adapted to be revolved thereabout by said armature, a bearing pin radially removed from the motor axis adapted to be revolved thereabout by said field, connections from one pin to one pair of brakes, and connections from the other pin to the other pair of brakes.

7. Brake mechanism comprising, in combination, two pairs of brakes, an electric motor having both field and armature revolvable, a bearing pin radially displaced from the motor axis adapted to be revolved thereabout by said armature, a bearing pin radially displaced from the motor axis adapted to be revolved thereabout by said field, connections from one pin to one pair of brakes, connections from the other pin to the other pair of brakes, and means to alter the relative radial displacement of one pin.

8. Brakes comprising, in combination, a plurality of sets of brakes, a brake shaft for operating one set of brakes, a brake shaft for operating another set of brakes, an arm extending radially from each of said brake operating shafts, an electric motor having both field and armature elements rotatable, linkage operable by rotation of the one element connected to the arm on one of said brake shafts, and linkage operable by rotation of the other element connected to the arm on the other of said brake shafts.

9. Brake mechanism comprising, in combination, a plurality of brakes, an electric motor having both field and armature elements revolvable, a bearing pin radially displaced from the axis of said field and adapted to revolve therewith, an armature shaft having and arm revolvable therewith, a bearing pin in said arm radially displaced from the motor axis, operative connections from the first pin to one brake, operative connections from the second said pin to another brake, and means to alter the radial location of said second pin.

10. Brake mechanism comprising, in combination, a plurality of brakes, an electric motor having independently revolvable field and armature elements, operative connections from the field to one brake, operative connections from the armature to another brake, a brake pedal, operative connections from said pedal to both brakes, and means responsive to variation in stress in the last named operative connections to vary the motor effort.

11. A brake system having a plurality of brakes, a brake operating member, an electric motor the field element and armature element of which are each free to rotate, operative connections between one brake and one of said motor elements, operative connections between the other brake and the other of said elements, and means controlled by said operating member to vary the motor effort.

12. A brake system as set forth in claim 11 wherein connections are provided between said operating member and said brakes whereby said member operates said brakes independently of said motor effort.

13. Brake mechanism comprising, in combination, brakes, an electrical power device provided with magnetically opposed oppositely revolvable elements, tension operating connections between one of the elements and certain of the brakes to be tensioned upon revolution of its element to exert brake applying force on its brakes, and tension operating connections between the other of said elements and certain other of the brakes to be tensioned upon revolution of its element to exert brake applying pressure upon its brakes.

14. Brake mechanism comprising, in combination, brakes, a power device having oppositely reacting power responsive revolvable elements, tension connections between one element and certain of the brakes, and tension connections between the other element and certain other of the brakes.

15. Brake mechanism comprising, in combination, brakes, a power device having oppositely reacting power responsive revolvable elements and adapted to receive energy from a single source of supply to revolve said elements in opposite directions, connections between one element and certain of the brakes, connections between the other element and certain other of said brakes, said connections adapted to be tensioned by the opposite revolution of the elements to exert brake applying pressure on the brakes.

16. Brake mechanism comprising, in combination, brakes, a power device having pivotally supported oppositely reacting power responsive swingable elements, connections between one element and one of the brakes, connections between another element and another of the brakes, said means adapted to be tensioned by said elements upon swingable movement thereof to exert brake applying pressure on the brakes.

17. Vehicle brake mechanism comprising, in combination, front wheel brakes, rear wheel brakes, a pair of spaced apart transverse brake shafts, connections between one shaft and the front wheel brakes, connections between the other shaft and the rear wheel brakes, a power device having oppositely reacting power responsive swingable elements positioned between said shafts, connections between one element and one of the shafts and connections between the other element and the other shaft adapted upon opposite swingable movement of said elements to rotate the shafts to exert brake applying pressure on the brakes.

18. Vehicle brake mechanism comprising, in combination, front wheel brakes, rear wheel brakes, a pair of spaced apart transversely extending brake shafts, tension connections between one shaft and the front wheel brakes, tension connections between the other shaft and the rear wheel brakes, a power device positioned between said shafts and having a pair of oppositely reacting power responsive rotating elements, tension connections between one element and one brake shaft, tension connections between the other element and the other brake shaft, said tension connections adapted and actuated upon opposite rotatable movement of said elements to rotate the shafts in opposite directions to tension the connections leading therefrom to the brakes to exert brake applying pressure on the brakes.

19. In combination with an automotive vehicle, a plurality of brakes, a dynamo including independently rotatable armature and field elements, and means connecting each of said elements with certain of said brakes whereby said connected brakes may be simultaneously actuated by the magnetic reaction between said field and armature elements.

20. Brake mechanism comprising, in combination, a plurality of brakes, an electric power device having independently oppositely rotatable field and armature elements, operative connections leading from one element to one brake, and operative connections leading from the other element to another brake.

21. Brake mechanism comprising, in combination, a plurality of brakes, an electric motor having independently revolvable field and armature elements, operative connections from the field to one brake, operative connections from the armature to another brake, a manually operable brake control member for the motor coupled therewith to regulate the brake effort thereof in direct proportion to the manual effort exerted upon said control member.

22. Brake mechanism comprising, in combination, a plurality of brakes, an electric motor having independently revolvable field and armature elements, operative connections from the field to one brake, operative connections from the armature to another brake, a manually operable brake control member for the motor coupled therewith to regulate the brake effort thereof in direct proportion to the manual effort exerted upon said control member, said control member coupled mechanically with the brakes whereby effort of brake application may be exerted thereon independently of the motor.

23. Brake mechanism comprising, in combination, a plurality of brakes, an electric motor having independently revolvable field and armature elements, operative connections from the field to one brake, operative connections from the armature to another brake, a manually operable brake control member for the motor coupled therewith to regulate the brake effort thereof in direct proportion to the manual effort exerted upon said control member, said control member coupled mechanically with the brakes whereby effort of brake application may be exerted thereon independently of the motor and simultaneously therewith.

In testimony whereof, I, VINCENT G. APPLE, sign this specification.

VINCENT G. APPLE.